US010240463B2

(12) United States Patent
Notarianni et al.

(10) Patent No.: US 10,240,463 B2
(45) Date of Patent: Mar. 26, 2019

(54) BLADE MADE OF ORGANIC MATRIX COMPOSITE MATERIAL PROVIDED WITH A METAL STRIP, AND A METHOD OF FASTENING A METAL STRIP ON A BLADE FIBER PREFORM

(71) Applicant: SNECMA, Paris (FR)

(72) Inventors: Gilles Pierre-Marie Notarianni, Brie-Comte-Robert (FR); Matthieu Arnaud Gimat, Paris (FR); Jérémy Guivarc'h, Paris (FR); Thibault Ruf, Lieusaint (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 347 days.

(21) Appl. No.: 15/070,585

(22) Filed: Mar. 15, 2016

(65) Prior Publication Data
US 2016/0312616 A1 Oct. 27, 2016

(30) Foreign Application Priority Data

Mar. 16, 2015 (FR) ...................... 15 52114

(51) Int. Cl.
*F01D 5/14* (2006.01)
*B29C 70/48* (2006.01)
(Continued)

(52) U.S. Cl.
CPC .............. *F01D 5/147* (2013.01); *B29C 70/48* (2013.01); *B29C 70/86* (2013.01); *B29D 99/0025* (2013.01); *B64C 11/205* (2013.01); *D05B 23/00* (2013.01); *F01D 5/282* (2013.01); *B29K 2705/00* (2013.01); *B29L 2031/08* (2013.01);
(Continued)

(58) Field of Classification Search
CPC ... F01D 5/147; B29D 99/0025; B64C 11/205; F05D 2230/60; F05D 2240/303; F05D 2300/6034; F05D 2250/281; D05B 23/00
See application file for complete search history.

(56) References Cited

FOREIGN PATENT DOCUMENTS

| FR | 2 718 101 A1 | 10/1995 |
| FR | 2 988 785 A1 | 10/2013 |
| GB | 2288441 A * | 10/1995 ............. B64C 11/26 |

OTHER PUBLICATIONS

Search Report as issued in French Patent Application No. 1552114, dated Jan. 27, 2016.

* cited by examiner

*Primary Examiner* — Carlos A Rivera
*Assistant Examiner* — Danielle M. Christensen
(74) *Attorney, Agent, or Firm* — Pillsbury Winthrop Shaw Pittman LLP (57) ABSTRACT

A blade made of organic matrix composite material for a gas turbine aeroengine, includes an airfoil extending transversely between a leading edge and a trailing edge; and a metal strip positioned on the leading edge of the airfoil, the metal strip having two flanges extending on either side of the leading edge over portions of the side faces of the airfoil forming a pressure side face and a suction side face so that the strip fits closely to the profile of the leading edge, the metal strip being fastened to the leading edge of the airfoil by at least one stitching thread; wherein the stitching thread has at least one external thread segment extending substantially transversely between a hole formed through a flange of the strip and a passage formed in a portion of the airfoil that has at least one face that is not covered by the metal strip.

11 Claims, 5 Drawing Sheets

(51) Int. Cl.
*B29C 70/86* (2006.01)
*B29D 99/00* (2010.01)
*B64C 11/20* (2006.01)
*F01D 5/28* (2006.01)
*D05B 23/00* (2006.01)
*B29L 31/08* (2006.01)
*B29K 705/00* (2006.01)

(52) U.S. Cl.
CPC ...... *F05D 2220/32* (2013.01); *F05D 2220/36* (2013.01); *F05D 2230/60* (2013.01); *F05D 2240/303* (2013.01); *F05D 2300/10* (2013.01); *F05D 2300/603* (2013.01); *F05D 2300/6034* (2013.01); *Y02T 50/672* (2013.01); *Y02T 50/673* (2013.01)

BLADE MADE OF ORGANIC MATRIX COMPOSITE MATERIAL PROVIDED WITH A METAL STRIP, AND A METHOD OF FASTENING A METAL STRIP ON A BLADE FIBER PREFORM

CROSS-REFERENCE TO RELATED APPLICATIONS

This application claims priority to French Patent Application No. 1552114, filed Mar. 16, 2015, the entire content of which is incorporated herein by reference in its entirety.

FIELD

The present invention relates to a gas turbine aeroengine blade made of organic matrix composite material incorporating a metal leading edge, and it also relates to a method of fastening a metal strip on a fiber preform for such a blade.

BACKGROUND

In the field of aviation, and in particular that of airplane turbojets, reducing the weight of parts constituting the turbojet is a major concern both in terms of the cost of fabricating such parts, and in terms of the energy and environmental effectiveness of turbojets. This challenge has led to rapid development of parts that are made of composite materials, and in particular of organic matrix composites (OMCs), in order to replace conventional metal parts in various portions of a turbojet.

Nevertheless, making blades out of organic matrix composite material raises certain problems, in particular in terms of ability to withstand impacts. The location of such blades, e.g. in a fan or a compressor, means that they can be exposed to impacts against a wide variety of items (birds, gravel, blocks of ice, sand, etc.) and blades made of OMC can then become damaged or eroded.

A known solution is to protect the leading edge of such a blade with a metal strip that is adhesively bonded to the leading edge, the strip itself being made of titanium, for example.

That solution provides the blade with good protection in the event of an impact against an item, but it can happen that the strip becomes unstuck at certain locations depending on the energy of the impact. Furthermore, such unsticking can lead in particular to additional repair costs and to degradation in the performance of the engine as a result of degraded aerodynamics of the blade, which is not desirable.

SUMMARY

A main aspect of the present invention is thus to mitigate such drawbacks by proposing to fasten a metal strip effectively to an organic matrix composite material blade in order to limit unsticking of the strip, in particular in the event of an impact against an item.

This aspect is achieved by a blade made of organic matrix composite material for a gas turbine aeroengine, the blade comprising:
an airfoil extending transversely between a leading edge and a trailing edge; and
a metal strip positioned on the leading edge of the airfoil, the metal strip having two flanges extending on either side of the leading edge over portions of the side faces of the airfoil forming a pressure side face and a suction side face in such a manner that the strip fits closely to the profile of the leading edge, the metal strip being fastened to the leading edge of the airfoil by at least one stitching thread. In accordance with an embodiment of the invention, the stitching thread has at least one external thread segment extending substantially transversely between a hole formed through a flange of the strip and a passage formed in a portion of the airfoil that has at least one face that is not covered by the metal strip.

The metal strip is mechanically fastened to the blade by a stitching thread that serves to hold it effectively against the leading edge of the blade. The strip is stitched on in such a manner that the external thread segments that are visible on the strip extend transversely, i.e. in the direction that air flows over the blade while it is rotating. The aerodynamics of the blade are thus little affected by the presence of such external thread segments. In addition, the modifications to the aerodynamics of the blade resulting from such thread segments are negligible compared with the modifications that would occur as a result of thread segments being oriented in a direction other than that of the flow of air over the blade in operation. Consequently, there is beneficially no need to machine the strip so as to form grooves serving to mask such thread segments, thereby limiting difficulties and costs involved with production.

In an embodiment, the two flanges of the metal strip are connected together by the stitching thread.

With such a provision, the two flanges of the metal strip extend on either side of the leading edge of the airfoil, thereby ensuring that the metal strip is retained better since it is clamped onto the leading edge.

In a first embodiment of the invention, the stitching thread connecting together the two flanges of the metal strip comprises at least one stitching loop that comprises:
a first internal thread segment passing through the airfoil across its thickness from its suction side face to its pressure side face via the passage through the airfoil;
a first external thread segment extending from a free end of the first internal thread segment substantially transversely beside the pressure side face of the airfoil;
a second internal thread segment extending from a free end of the first external thread segment and passing through the airfoil across its thickness from its pressure side face to its suction side face;
a second external thread segment extending from the free end of the second internal thread segment substantially transversely beside the suction side face of the airfoil towards the first internal thread segment; and
a third internal thread segment passing through the airfoil across its thickness from its suction side face towards its pressure side face along the same path as the first internal thread segment.

When the stitching thread has a plurality of stitching loops, the external thread segment interconnecting two stitching loops may beneficially be positioned on the portions of the airfoil that are not covered by the strip so as to be masked within them, so as to avoid forming an aerodynamic step.

In a second embodiment of the invention, the stitching thread connecting together the two flanges of the metal strip includes at least one double stitching loop that comprises:
a first internal thread segment passing through the airfoil across its thickness from its suction side face to its pressure side face via the passage in the airfoil;
a first external thread segment extending from a free end of the first internal thread segment substantially transversely beside the pressure side face of the airfoil;

a second internal thread segment extending from a free end of the first external thread segment and passing through the airfoil across its thickness from its pressure side face to its suction side face;

a second external thread segment extending from a free end of the second internal thread segment substantially transversely beside the suction side face of the airfoil away from the first internal thread segment;

a third internal thread segment extending from a free end of the second external thread segment through the airfoil across its thickness from its suction side face to its pressure side face;

a third external thread segment extending from a free end of the third internal thread segment substantially transversely beside the pressure side face of the airfoil towards the second internal thread segment;

a fourth internal thread segment extending from a free end of the third external thread segment and passing through the airfoil along the path of the second internal thread segment;

a fourth external thread segment extending from a free end of the fourth internal thread segment substantially transversely beside the suction side face of the airfoil towards the first internal thread segment; and a fifth internal thread segment extending from a free end of the fourth external thread segment and through the airfoil following the path of the first internal thread segment.

The blade may comprise a plurality of stitching loops and/or double stitching loops that are longitudinally spaced apart from one another along the height of the airfoil.

The same stitching thread may pass at least twice around a stitching loop or a double stitching loop.

An aspect of the invention also provides a method of fastening a metal strip on a fiber preform for a gas turbine aeroengine blade, the method comprising:

a step of positioning the metal strip on a leading edge of the fiber preform of the blade; and a fastening step of fastening the metal strip on the fiber preform of the blade, the fastening step comprising forming at least one stitching loop with at least one stitching thread, the stitching thread comprising at least one external thread segment extending substantially transversely between a hole formed through a flange of the strip and a passage formed in a portion of the fiber preform that has at least one face that is not covered by the metal strip.

In an implementation of the method, in order to form a stitching loop, the stitching thread passes initially through the airfoil from its suction side face to its pressure side face via the passage in the preform so as to form a first internal thread segment, the thread then passes through the preform across its thickness from its pressure side face to its suction side face passing via the holes formed in each of the flanges of the strip so as to form a second internal thread segment, the first internal thread segment and the second internal thread segment being connected together by a first external thread segment that extends transversely, the thread finally passes through the preform across its thickness following the path of the first internal thread segment so as to form a third internal thread segment, the second internal thread segment and the third internal thread segment being connected together by a second external thread segment that extends transversely.

In an embodiment, the method also includes an injection step of injecting a thermoplastic resin into injection tooling having placed therein the fiber preform of the blade with the metal strip fastened thereon so as to embed the stitching thread in the resin and overmold the metal strip.

This additional step makes it possible, beneficially, to reduce the size of the steps formed by the longitudinal external thread segments interconnecting the various loops, while still providing better retention of the metal strip on the airfoil since it is overmolded. The free ends of the stitching thread are embedded in the resin during this step, and the strip is formed against the leading edge by the front of material of the resin being injected, thereby causing it to fit more closely to the leading edge of the blade.

An aspect of the invention also provides a turbine engine including a blade as described above or including a metal strip fastened on a blade fiber preform by a method as described above.

BRIEF DESCRIPTION OF THE DRAWINGS

Other characteristics and benefits of the present invention appear from the following description made with reference to the accompanying drawings, which show embodiments having no limiting character. In the figures.

DETAILED DESCRIPTION

Figure 1:
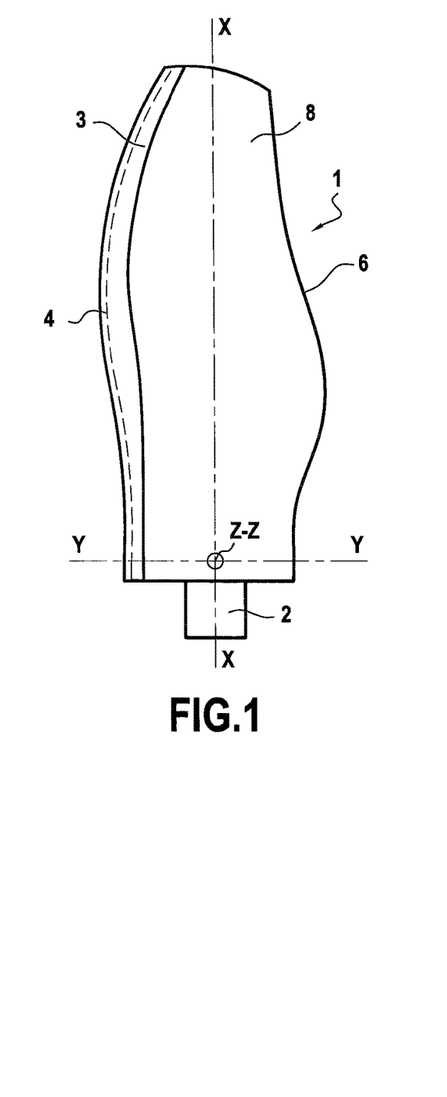
FIG. 1 is a diagram of a turbine engine fan blade provided with a metal strip.

FIG. 1 is a very diagrammatic view of a fan blade 1 of a gas turbine aeroengine, the blade being made of organic matrix composite material.

In known manner, the blade 1 comprises a root 2 and an airfoil 8 designed to be situated in the stream of air passing through the engine.

Figure 2:
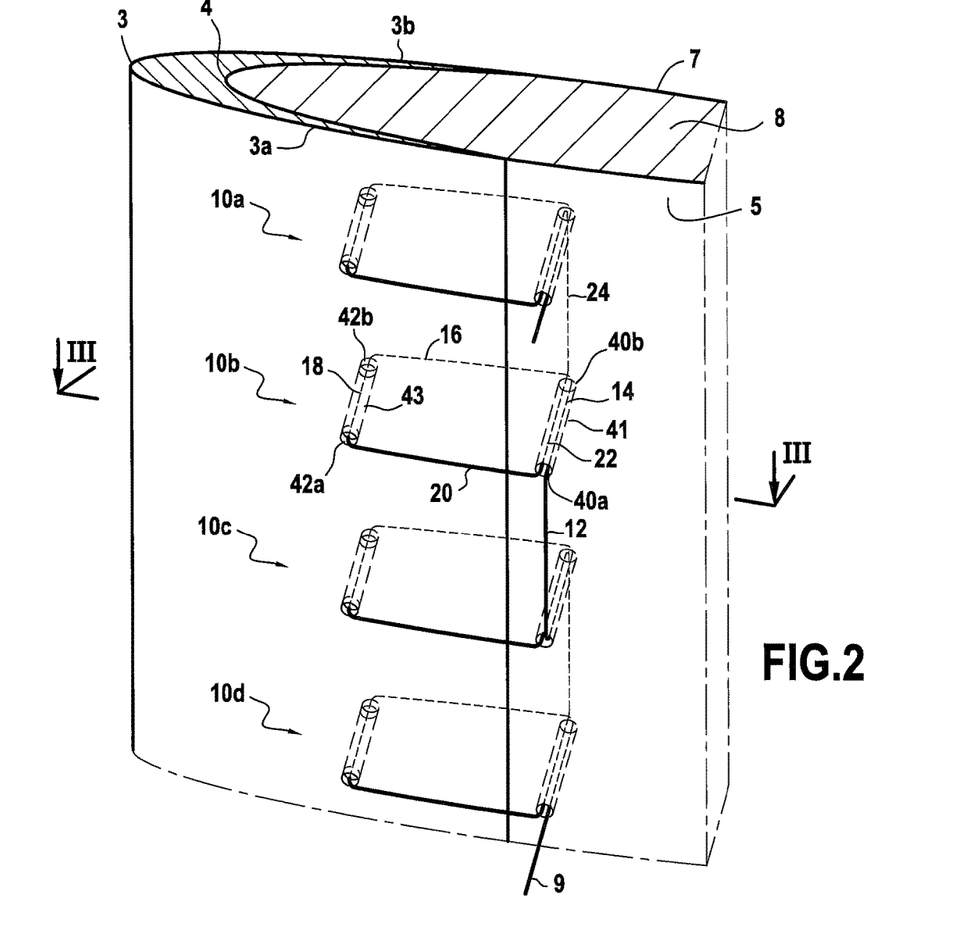
FIG. 2 is a diagrammatic view of an airfoil in an embodiment of the invention.

The airfoil 8 extends longitudinally in a first direction along an axis X-X from the root 2 to a tip of the blade, it extends transversely in a second direction along an axis Y-Y from a leading edge 4 to a trailing edge 6, and it extends in a third direction along an axis Z-Z perpendicular to the axes X-X and Y-Y between a pressure side face 7 and a suction side face 5 (FIG. 2).

The leading edge 4 of the airfoil is covered in a metal strip 3 that is fastened thereto and that serves to provide protective reinforcement. The strip comprises two flanges 3a, 3b (FIG. 2) that extend on either side of the leading edge 4 over portions of the suction and pressure side faces 5 and 7.

In known manner, the metal strip 3 may be made of titanium, nickel, aluminum, or any other metal or alloy or metal matrix composite.

In the invention, the metal strip 3 is fastened to the airfoil 8 by stitching using a stitching thread 9.

The stitching of the airfoil may be performed using stitching threads made of silicon-titanium alloy, of carbon, of Kevlar®, of metal, etc.

Figure 3:
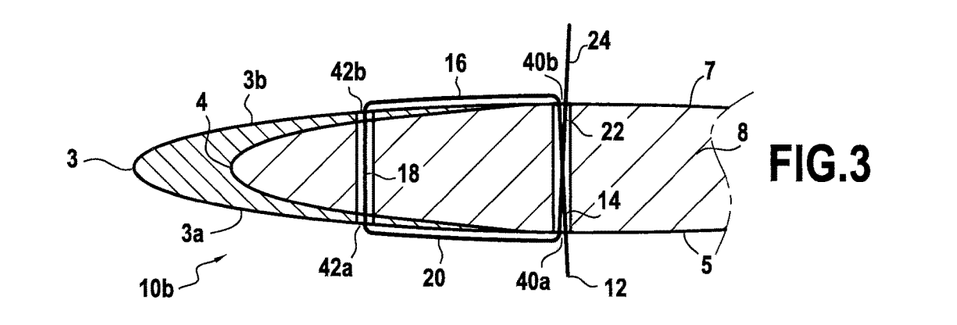
FIG. 3 is a view of the FIG. 2 airfoil in cross-section on plane III.

A method of fastening the metal strip 3 on a fiber preform in order to make the airfoil 8 of FIGS. 2 and 3 is described below.

The blade 1 is made from a fiber preform, and prior to a step of injecting resin, the metal strip 3 is put into place on the preform and the operations of stitching the strip are performed.

In known manner, the fiber preform may be made by three-dimensional or multilayer weaving of fibers made of carbon, glass, SiC, metal, etc.

In a first embodiment of the invention, the two flanges 3a, 3b of the metal strip 3 are stitched together by a thread 9 via a set of stitching loops 10a, 10b, 10c, 10d that are regularly spaced apart along the height of the airfoil 8.

The stitching loop 10b begins with a first thread end 12 that may be connected to another stitching loop 10c.

In order to make a stitching loop 10b, the thread is passed through an entry 40a situated in the suction side face 5 to a passage 41 through a portion of the airfoil 8 that is not covered by the metal strip 3, and it is caused to leave through the pressure side 7 via an exit 40b from the passage 41. The portion of the thread passing through the airfoil at the end of this step is a first internal thread segment 14.

Thereafter, the thread is caused to pass through a hole 42b formed in the flange 3b so as to form a first external thread segment 16 that extends transversely between the exit 40b and the hole 42b.

Thereafter, the thread passes through the airfoil from its pressure side face 7 to its suction side face 5 via a passage 43 between the hole 42b and an opposite hole 42a formed in the flange 3a (i.e. the holes 42b and 42a are substantially in alignment along the axis Z-Z), thereby forming a second internal thread segment 18.

The following step consists in causing the thread to pass once more through the airfoil via the passage 41 from the suction side face 5 to the pressure side face 7, thereby defining a second external thread segment 20 extending transversely between the hole 42a and the entry 40a, and a third internal thread segment 22 that follows the same path as the first internal thread segment 14 and leaves via the exit 40b.

The stitching loop 10b is terminated by a thread end 24 that can then be used for making another stitching loop 10a.

It is possible to repeat these operations one or more times in order to increase the strength of a stitching loop. For example, the same stitching thread may be caused to pass twice around the same stitching loop.

The stitching loop 10a, 10b, 10c, and 10d extend over the flanges 3a, 3b of the metal strip 3 and also over the portion of the airfoil 8 that is not covered by the metal strip.

The longitudinal thread ends 12 and 24 connecting together two stitching loops may be brought close to the borders of the strip in order to reduce any impact on the aerodynamics of the blade 1.

Figure 4:
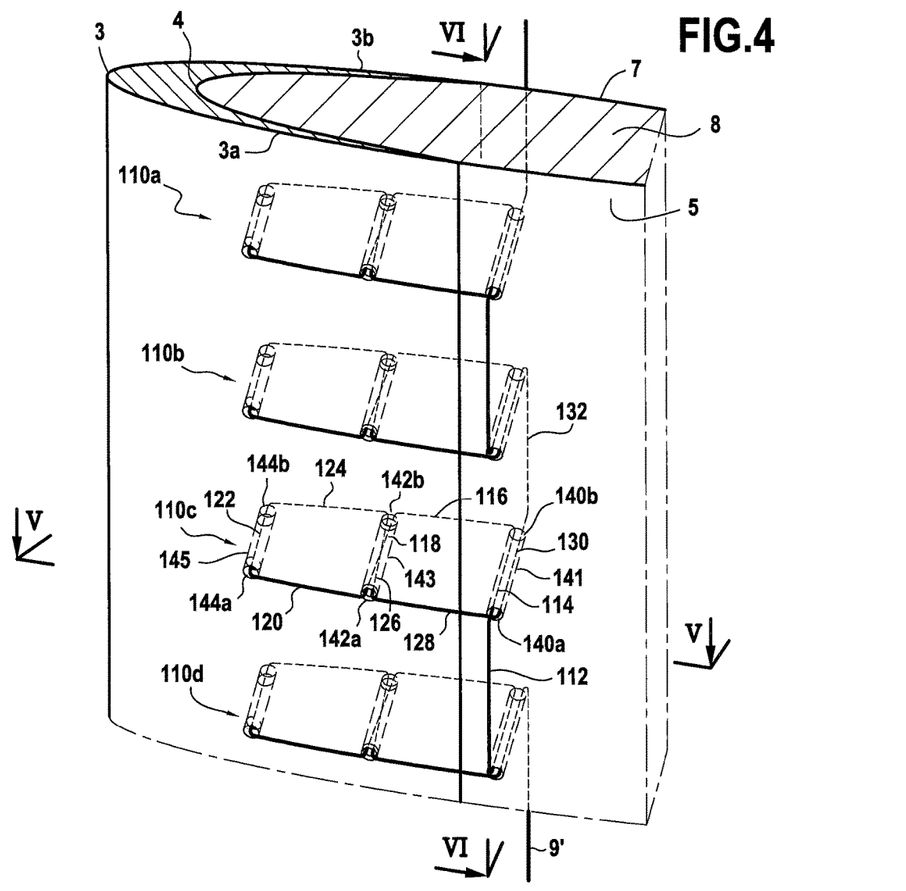
FIG. 4 is a diagrammatic view of an airfoil in another embodiment of the invention.
Figure 5:
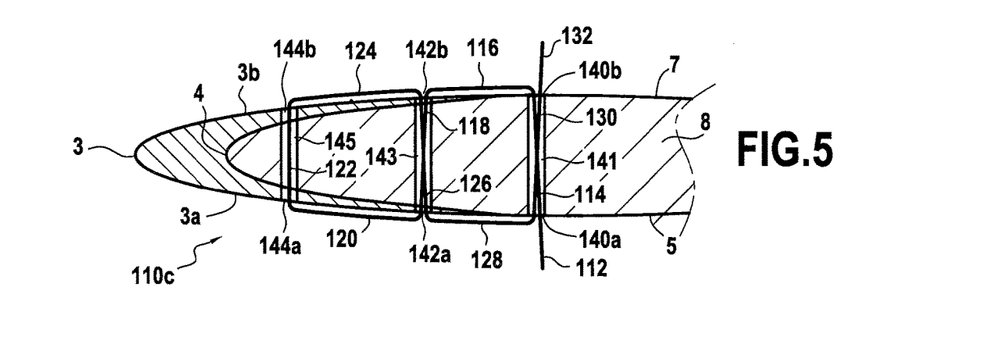
FIG. 5 is a view of the FIG. 4 airfoil in cross-section in plane V.
Figure 6:
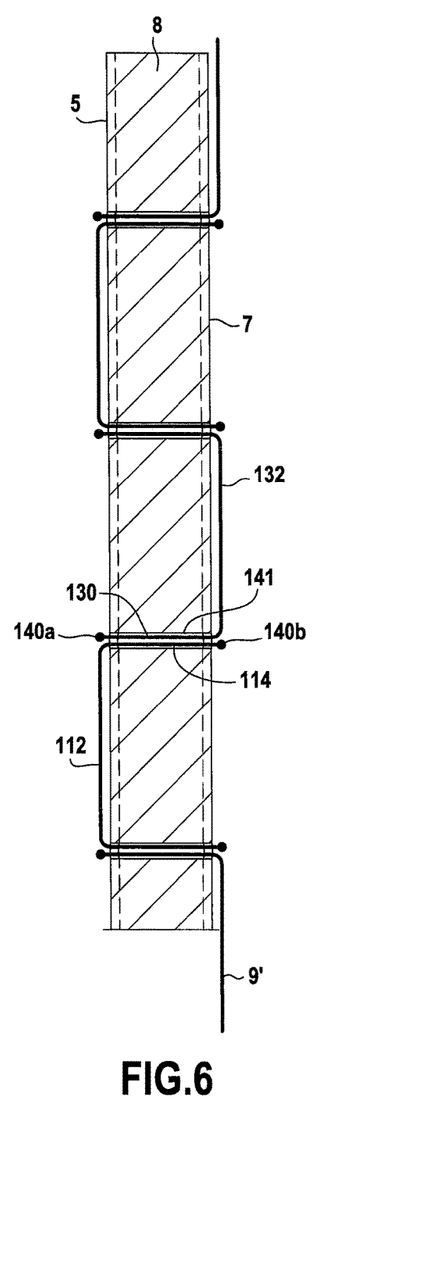
FIG. 6 is a view of the FIG. 4 airfoil in longitudinal section on plane VI.

FIGS. 4, 5, and 6 are diagrams showing an airfoil in a second embodiment of the invention.

In this embodiment of the invention, the two flanges 3a, 3b of the metal strip 3 are stitched together by a thread 9' via a set of double stitching loops 110a, 110b, 110c, and 110d that are regularly spaced apart along the height of the airfoil 8.

The double stitching loop 110c begins with a first thread end 112 that may be connected to another double stitching loop 110d.

In order to make a double stitching loop 110c, the thread is passed through an entry 140a situated in the suction side face 5 of a passage 141 passing through a portion of the airfoil 8 that is not covered by the metal strip 3, and it is caused to leave in the pressure side face 7 via an exit 140b of the passage 141, such that it passes through the airfoil 8. The portion of the thread that passes through the airfoil 8 during this step constitutes a first internal thread segment 114.

Thereafter, the thread is passed via a hole 142b formed in the flange 3b, thereby forming a first external thread segment 116 that extends transversely between the exit 140b and the hole 142b.

Thereafter, the thread passes through the airfoil 8 via a passage 143 between the hole 142b and a hole 142a formed in the flange 3a opposite to the hole 142b so as to form a second internal thread segment 118.

The next step consists in passing through the airfoil via a passage 145 situated between two opposite holes 144a and 144b formed respectively in the flange 3a and in the flange 3b closer to the leading edge than the holes 142a and 142b, thereby forming a second external thread segment 122 extending transversely between the hole 142a and the hole 144a, followed by a third internal thread segment 122 passing through the airfoil from the suction side face 5 to the pressure side 7 between the holes 144a and 144b.

Thereafter, the thread passes once more through the airfoil via the passage 143 between the holes 142b and 142a from the pressure side face 7 to the suction face 5, thus forming a third external thread segment 124 extending transversely between the hole 144b and the 142b, followed by a fourth internal thread segment 126 passing through the airfoil between the holes 142b and 142a along the same path as the second internal thread segment 118.

The double stitching loop 110c terminates by the stitching thread passing through the airfoil 8 from its suction side face 5 to its pressure side 7 via the passage 141, thus forming a fourth external thread segment 128 extending transversely between the hole 142a and the entry 140a, and a fifth internal thread segment 130 passing through the airfoil between the entry 140a and the exit 140b along the same path as the first internal thread segment 114.

The double stitching loop 110c terminates with a thread end 132 that can be then be used for making another double stitching loop 110b.

The longitudinal thread ends 112, 132 interconnecting two double stitching loops may be brought close to the borders of the strip in order to reduce their impact on the aerodynamics of the blade 1.

In order to make the double stitching loop 110c of the invention correctly, the holes 142a, 144a, and 142b, 144b in the strip, and the entry 140a and the exit 140b of a passage need to be in alignment in a transverse direction on each face.

It is possible to repeat these operations one or more times in order to increase the strength of a double stitching loop. For example, it is possible to cause the same stitching thread to pass twice along the same double stitching loop.

The stitching of the metal strip onto the fiber preform may be performed by using both stitching loops and double stitching loops that are distributed along part or all of the height of the airfoil.

After stitching has been terminated, it is desirable to insert the free ends of the thread 9, 9' into the inside of the woven fiber preform so that they become embedded during injection.

Figure 7:
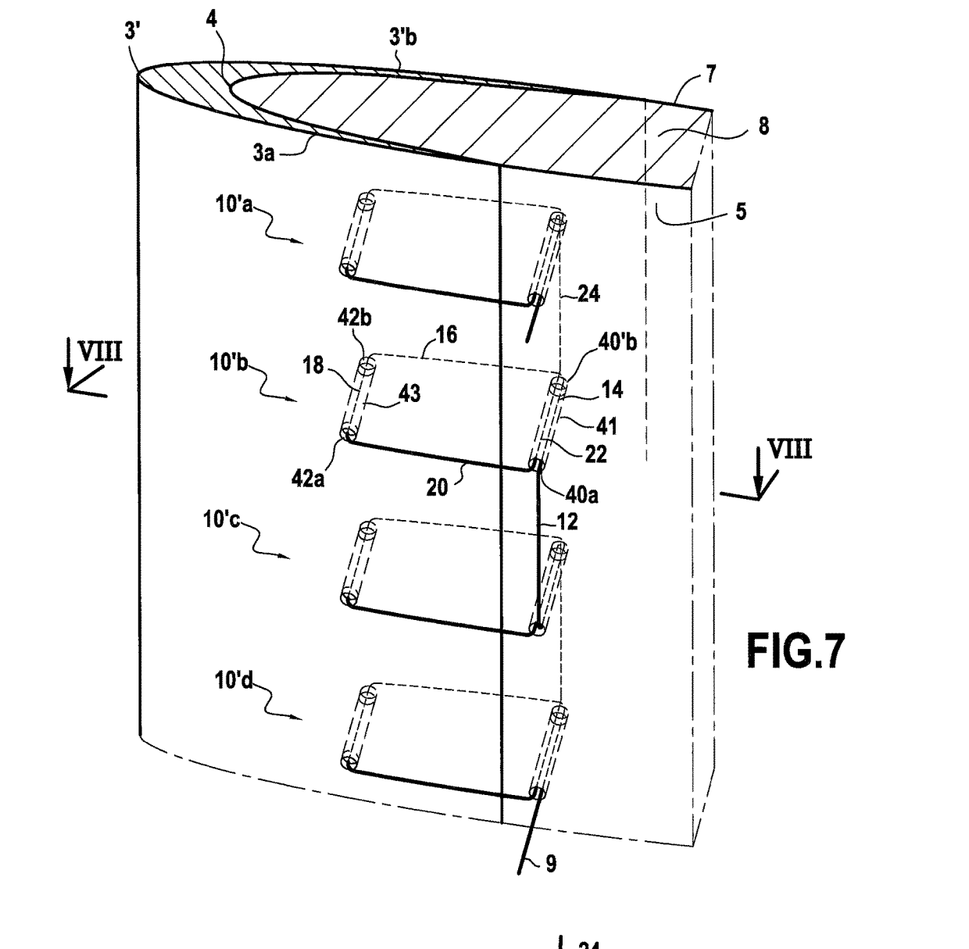
FIG. 7 is a diagrammatic view of an airfoil in a third embodiment of the invention.
Figure 8:
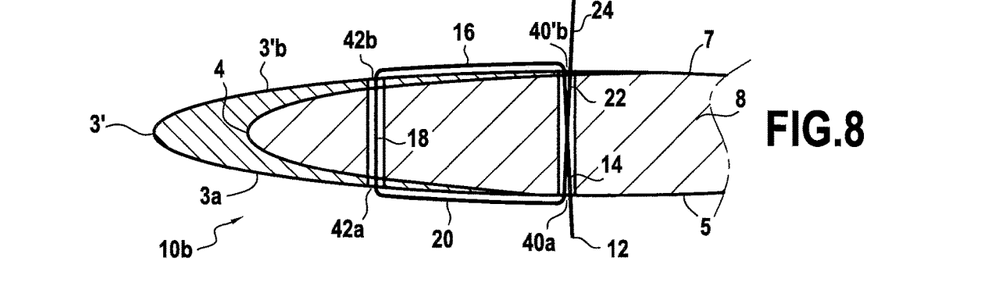
FIG. 8 is a view of the FIG. 7 airfoil in cross-section on plane VIII.

FIGS. 7 and 8 are diagrams of an airfoil 8 in a third embodiment of the invention.

The flange 3'b extending over the pressure side face 7 of the airfoil is longer than the flange 3a extending over the suction side face 5.

In one configuration, the exit 40b of the passage 41 in the airfoil 8 shown in FIGS. 2 and 3 faces a hole 40'b formed in the flange 3'b of the metal strip that now covers an additional portion of the pressure side face 7. There is thus an additional row of holes in longitudinal alignment in the flange 3'b.

It is possible to make a stitching loop 10'a, 10'b, 10'c, or 10'd in the same manner as in the embodiment of FIGS. 2 and 3, by replacing the exit 40b from the passage 41 by the hole 40'b.

It is equally possible to envisage making double stitching loops in the same manner as shown in FIGS. 4, 5, and 6 by adding a row of longitudinally-aligned opposite holes in the flanges 3a and 3'b of the metal strip 3'.

The presence of holes 40'b in the flange 3'b covering a portion of the pressure side face 7 requires steps to be present on the metal strip that are formed by longitudinal external segments 24.

The way in which the stitching is performed may be adapted so as to maximize the number of these longitudinal external segments that are on the flange 3'b and minimize the number of longitudinal external segments that are present on the suction side face 5 as a function of the number of loops that it is desired to make. It is desirable to reduce the number of steps on the suction side face 5 in order to minimize impacts on the aerodynamics of the blade.

In another configuration (not shown), the metal strip 3' is not pierced by additional holes 40'b in its flange 3'b, and stitching can then be performed in a manner identical to the embodiments of FIGS. 2 to 6.

Figure 9:
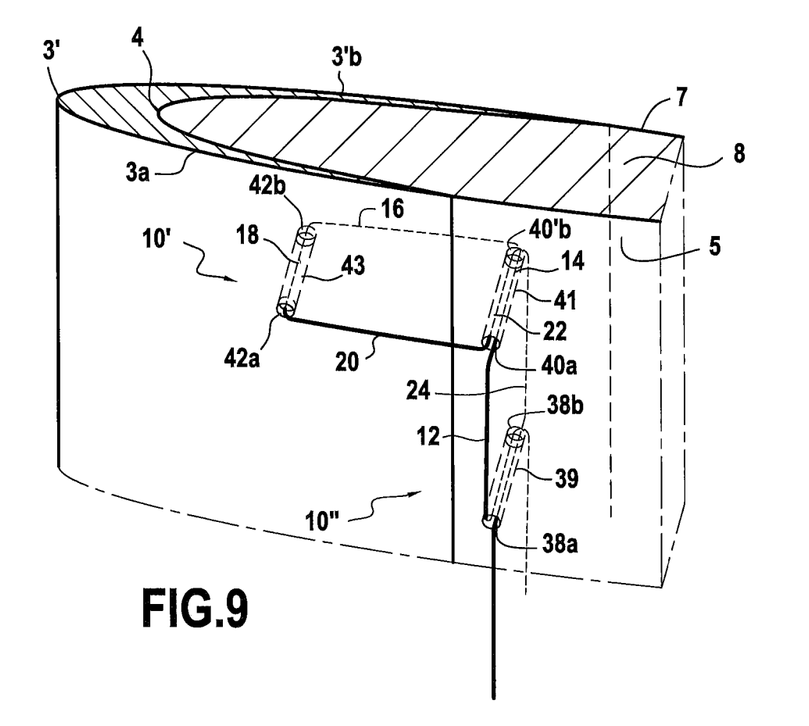
FIG. 9 is a diagrammatic view of an airfoil in a fourth embodiment of the invention.

FIG. 9 shows a fourth embodiment of the invention.

A return loop 10" is provided in order to strengthen the attachment of the metal strip to the leading edge, preferably in the vicinity of the longitudinal end of the blade.

The return loop 10" comprises a stitching loop 10' identical to the loops 10'a, 10'b, 10'c, and 10'd of the embodiment shown in FIGS. 7 and 8. In addition, after making a stitching loop 10', the thread ends 12 and 14 of the stitching loop 10' pass through the airfoil once more via the passage 39 situated between a hole 38b formed in the flange 3'b and an entry 38a in the suction side 5 of the airfoil. The hole 38b and the entry 38a are substantially in longitudinal alignment with the hole 40'b and the entry 40a.

Once stitching has been terminated, the ends of a stitching loop 10'a, 10'b, 10'c, or 10'd, or of a return loop 10" can be inserted into the fiber preform of the blade so as to become embedded subsequently in a resin during injection.

Once the strip has been stitched onto the fiber preform of the blade, the assembly can be placed in an injection mold in order to inject a thermoactive or thermoplastic resin therein and obtain, once the resin has solidified, a blade 1 made of organic matrix composite material with a metal strip, as shown in FIG. 1.

During injection, the front of material created by the resin while it is being injected shapes the strip against the leading edge of the blade, embeds the stitching threads, and overmolds the strip.

The mentions made of the "pressure" and "suction" side faces of the airfoil can equally well be interchanged in the above description and they should not be interpreted in limiting manner.

The invention claimed is:

1. A blade made of organic matrix composite material for a gas turbine aeroengine, the blade comprising:
   an airfoil extending transversely between a leading edge and a trailing edge; and
   a metal strip positioned on the leading edge of the airfoil, said metal strip having two flanges extending on either side of the leading edge over portions of side faces of the airfoil forming a pressure side face and a suction side face in such a manner that the metal strip fits closely to the profile of the leading edge, the metal strip being fastened to the leading edge of the airfoil by at least one stitching thread;
   wherein said stitching thread has at least one external thread segment extending substantially along a transverse direction of the blade between a hole formed through a flange of the metal strip and a passage formed in a portion of the airfoil that has a surface that is not covered by the metal strip, said transverse direction connecting the leading edge and the trailing edge of the blade.

2. A blade according to claim 1, wherein the two flanges of the metal strip are connected together by the at least one stitching thread.

3. A blade according to claim 2, wherein the at least one stitching thread connecting together the two flanges of the metal strip comprises at least one stitching loop that comprises:
   a first internal thread segment passing through the airfoil across its thickness from its suction side face to its pressure side face via the passage through the airfoil;
   a first external thread segment extending from a free end of the first internal thread segment substantially along the transverse direction of the blade and beside the pressure side face of the airfoil;
   a second internal thread segment extending from a free end of the first external thread segment and passing through the airfoil across its thickness from its pressure side face to its suction side face;
   a second external thread segment extending from the free end of the second internal thread segment substantially along the transverse direction of the blade and beside the suction side face of the airfoil towards the first internal thread segment; and
   a third internal thread segment passing through the airfoil across its thickness from its suction side face towards its pressure side face along the same path as the first internal thread segment.

4. A blade according to claim 3, comprising a plurality of stitching loops and/or double stitching loops that are longitudinally spaced apart from one another along the height of the airfoil.

5. A blade according to claim 3, wherein a single stitching thread passes at least twice around a stitching loop or a double stitching loop.

6. A blade according to claim 2, wherein the at least one stitching thread connecting together the two flanges of the metal strip includes at least one double stitching loop that comprises:
   a first internal thread segment passing through the airfoil across its thickness from its suction side face to its pressure side face via the passage in the airfoil;
   a first external thread segment extending from a free end of the first internal thread segment substantially along the transverse direction of the blade and beside the pressure side face of the airfoil;

a second internal thread segment extending from a free end of the first external thread segment and passing through the airfoil across its thickness from its pressure side face to its suction side face;

a second external thread segment extending from a free end of the second internal thread segment substantially along the transverse direction of the blade and beside the suction side face of the airfoil away from the first internal thread segment;

a third internal thread segment extending from a free end of the second external thread segment through the airfoil across its thickness from its suction side face to its pressure side face;

a third external thread segment extending from a free end of the third internal thread segment substantially along the transverse direction of the blade and beside the pressure side face of the airfoil towards the second internal thread segment;

a fourth internal thread segment extending from a free end of the third external thread segment and passing through the airfoil along the path of the second internal thread segment;

a fourth external thread segment extending from a free end of the fourth internal thread segment substantially along the transverse direction of the blade and beside the suction side face of the airfoil towards the first internal thread segment; and a fifth internal thread segment extending from a free end of the fourth external thread segment and through the airfoil following the path of the first internal thread segment.

7. A turbine engine comprising a blade according to claim 1.

8. A method of fastening a metal strip on a fiber preform for a gas turbine aeroengine blade, the method comprising:
positioning the metal strip on a leading edge of the fiber preform of the blade; and
fastening the metal strip on the fiber preform of the blade, the fastening comprising forming at least one stitching loop with at least one stitching thread, said least one stitching thread comprising at least one external thread segment extending substantially along a transverse direction of the blade between a hole formed through a flange of the strip and a passage formed in a portion of the fiber preform that has a surface that is not covered by the metal strip, said transverse direction connecting the leading edge and a trailing edge of the blade.

9. A method according to claim 8, wherein, in order to form a stitching loop, the least one stitching thread passes initially through the airfoil from its suction side face to its pressure side face via the passage in the preform so as to form a first internal thread segment, said least one stitching thread then passes through the preform across its thickness from its pressure side face to its suction side face passing via the holes formed in each of the flanges of the strip so as to form a second internal thread segment, the first internal thread segment and the second internal thread segment being connected together by a first external thread segment that extends along the transverse direction, said least one stitching thread finally passes through the preform across its thickness following the path of the first internal thread segment so as to form a third internal thread segment, the second internal thread segment and the third internal thread segment being connected together by a second external thread segment that extends along the transverse direction.

10. A method according to claim 8, further comprising injecting a thermoactive or thermoplastic resin into injection tooling having placed therein the fiber preform of the blade with the metal strip fastened thereon so as to embed the least one stitching thread in the resin and overmold the metal strip.

11. A turbine engine comprising a metal strip fastened on a blade fiber preform by a method according to claim 8.

* * * * *